(12) United States Patent
Cho et al.

(10) Patent No.: US 12,077,439 B2
(45) Date of Patent: Sep. 3, 2024

(54) METHOD FOR PREPARING REDUCED GRAPHENE OXIDE-MAGNESIUM NANOCRYSTAL COMPOSITE

(71) Applicant: KOREA ADVANCED INSTITUTE OF SCIENCE AND TECHNOLOGY, Daejeon (KR)

(72) Inventors: Eun Seon Cho, Daejeon (KR); Dong Ju Han, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 344 days.

(21) Appl. No.: 17/505,760

(22) Filed: Oct. 20, 2021

(65) Prior Publication Data
US 2022/0153588 A1    May 19, 2022

(30) Foreign Application Priority Data
Nov. 13, 2020 (KR) .................. 10-2020-0152146

(51) Int. Cl.
*C01B 32/198* (2017.01)
*B82Y 30/00* (2011.01)
*B82Y 40/00* (2011.01)
*C01B 3/00* (2006.01)

(52) U.S. Cl.
CPC .......... *C01B 32/198* (2017.08); *C01B 3/0078* (2013.01); *B82Y 30/00* (2013.01); *B82Y 40/00* (2013.01); *C01P 2004/62* (2013.01); *C01P 2004/64* (2013.01); *C01P 2006/90* (2013.01)

(58) Field of Classification Search
CPC ... C01B 3/0078; C01B 32/192; C01B 32/182; C01B 32/198; B82Y 40/00; B82Y 30/00
See application file for complete search history.

(56) References Cited

U.S. PATENT DOCUMENTS

2012/0214068 A1* 8/2012 Dai .................. H01M 4/131
                                                977/734
2018/0186630 A1* 7/2018 Urban .................. C01B 3/0026

FOREIGN PATENT DOCUMENTS

JP    H10-72201     3/1998
JP    4986101       7/2012
JP    2015-182939   10/2015

(Continued)

OTHER PUBLICATIONS

Zhang J, Yang H, Shen G, Cheng P, Zhang J, Guo S. Reduction of graphene oxide via L-ascorbic acid. Chem Commun (Camb). Feb. 21, 2010;46(7):1112-4. (Year: 2010).*

(Continued)

*Primary Examiner* — Anthony J Zimmer
*Assistant Examiner* — Eric Scott Sherman
(74) *Attorney, Agent, or Firm* — LEX IP MEISTER, PLLC

(57) ABSTRACT

Disclosed is a method for preparing a reduced graphene oxide-magnesium nanocrystal composite. The method includes contacting graphene oxide with a first reducing agent to prepare a reduced graphene oxide, and co-reducing the reduced graphene oxide and a precursor of magnesium in the presence of a second reducing agent to prepare a reduced graphene oxide-magnesium nanocrystal composite, wherein by adjusting the amount of the first reducing agent in contact with the graphene oxide, the size of the magnesium nanocrystals in the composite may be controlled.

12 Claims, 6 Drawing Sheets

High defect density

Low defect density

(56) References Cited

FOREIGN PATENT DOCUMENTS

| | | |
|---|---|---|
| JP | 2017-185479 | 10/2017 |
| KR | 10-1106508 | 1/2012 |
| KR | 10-1514130 | 4/2015 |
| KR | 10-1546037 | 8/2015 |
| KR | 10-2017-0118355 | 10/2017 |
| KR | 10-2020-0023314 | 3/2020 |

OTHER PUBLICATIONS

Dong Ju Han et al., "Revealing the role of defects in graphene oxide in the evolution of magnesium nanocrystals and the resulting effects on hydrogen storage", J. Mater. Chem. A, 2021, 9, p. 9875-9881.

Eun Seon Cho et al., "Graphene oxide/metal nanocrystal multilaminates as the atomic limit for safe and selective hydrogen storage", Nature communications, vol. 7, article No. 10804, Feb. 23, 2016.

Kaja Spilarewicz-Stanek et al., "Elucidation of the function of oxygen moieties on graphene oxide and reduced graphene oxide in the nucleation and growth of silver nanoparticles", RSC advances, vol. 6, issue65, pp. 60056-60067, Jun. 15, 2016.

Swasmi Purwajanti et al., "Mg(OH)2-MgO@Reduced Graphene Oxide Nanocomposites: The Roles of Composition and Nanostructure on Arsenite Sorption", Journal of Materials Chemistry A, vol. 5, issue.46, pp. 24484-24492, Nov. 2, 2017.

Eun Seon Cho et al., "Hierarchically Controlled Inside-Out Doping of Mg Nanocomposites for Moderate Temperature Hydrogen Storage", Advanced Functional Materials. 2017, 27, 1704316, Oct. 24, 2017.

Wei Liu et al., "Size effects and hydrogen storage properties of Mg nanoparticles synthesised by an electroless reduction method", Journal of Materials Chemistry A 2014, 2 (25), 9718-9726, Apr. 15, 2014.

Nick S. Norberg et al., "Size-Dependent Hydrogen Storage Properties of Mg Nanocrystals Prepared from Solution", Journal of the American Chemical Society 2011, 133 (28), 10679-10681, Jun. 14, 2011.

\* cited by examiner

FIG. 2 (a) Example 3   FIG. 2 (b) Example 1   FIG. 2 (c) Example 2

FIG. 4
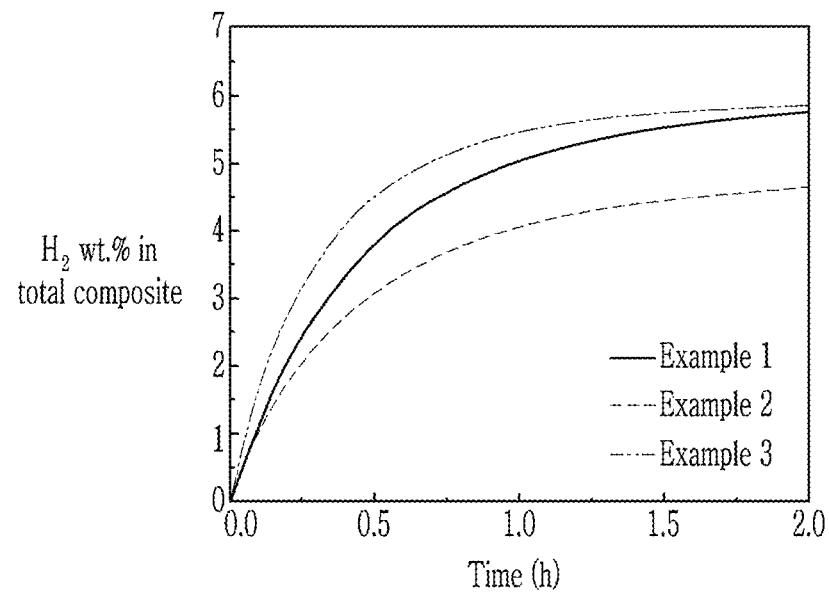
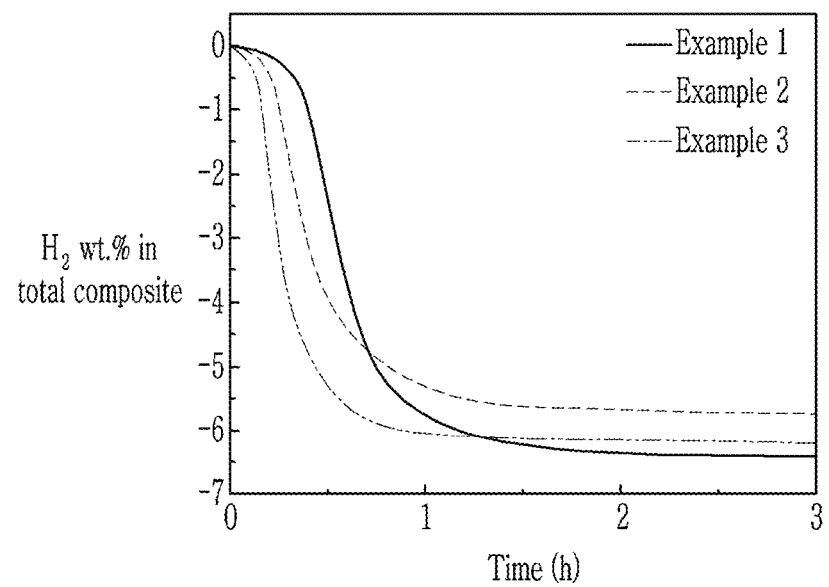

FIG. 5
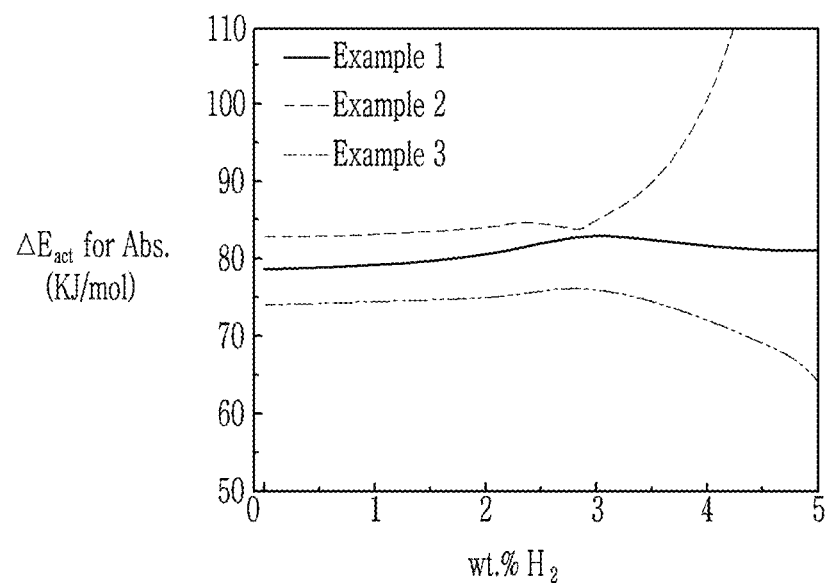
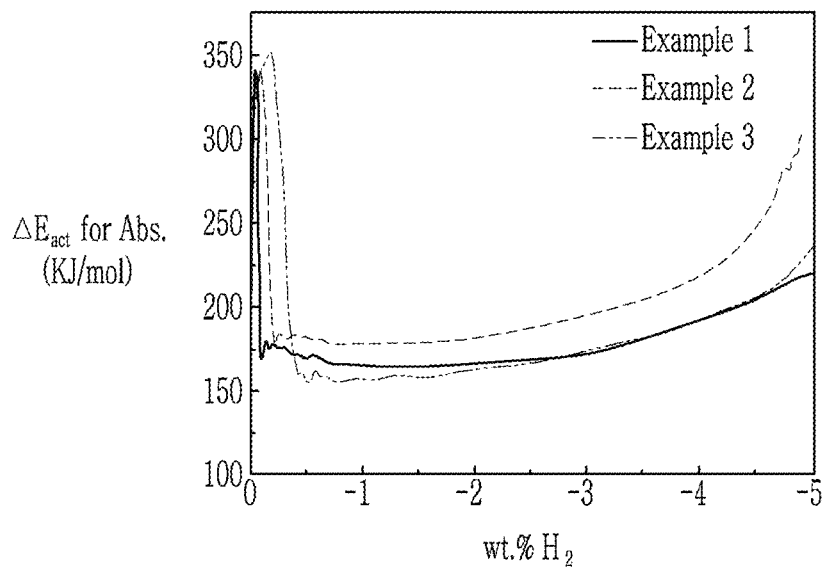

METHOD FOR PREPARING REDUCED GRAPHENE OXIDE-MAGNESIUM NANOCRYSTAL COMPOSITE

CROSS-REFERENCE TO RELATED APPLICATION

This application claims priority to and the benefit of Korean Patent Application No. 10-2020-0152146 filed in the Korean Intellectual Property Office on Nov. 13, 2020, the entire contents of which are incorporated herein by reference.

BACKGROUND OF THE INVENTION

(a) Field of the Invention

A method for preparing a reduced graphene oxide-magnesium nanocrystal composite is disclosed.

(b) Description of the Related Art

Recently, as hydrogen has been spotlighted as a low-carbon fuel, an effective hydrogen storage system enabling rapid hydrogen charging/discharging is imperative. Compared to battery-powered electric vehicles, the hydrogen fuel cell-based vehicles provide high power density and short charging/discharging time, which can be applied for commercial vehicles such as trucks and buses.

However, the current hydrogen storage system such as compressed hydrogen gas has problems of low volumetric storage density and explosion risk. In addition, liquid hydrogen may have a potential efficiency loss of about 12.8% compared with gaseous hydrogen.

Accordingly, methods of storing hydrogen in a solid state such as metal hydrides have drawn attention due to high storage density and safety as alternatives to physical-based storage systems, wherein magnesium is one of the promising hydrogen storage materials due to its high theoretical storage capacity and reversibility.

However, magnesium and its hydride (Mg/MgH$_2$) have sluggish hydrogen absorption/desorption kinetics and strong thermodynamic stability. Thus, magnesium-based system has drawbacks of requiring high temperature for hydrogenation/dehydrogenation and long charging time.

In order to overcome these drawbacks, research on a nanostructured magnesium composite with a carbon scaffold, a transition metal, or the like is being conducted.

SUMMARY OF THE INVENTION

Provided are a reduced graphene oxide-magnesium nanocrystal composite that can be used as a hydrogen storage material and a method for preparing the same.

Specifically, in the method for preparing the reduced graphene oxide-magnesium nanocrystal composites, the size of magnesium nanocrystals in the reduced graphene oxide-magnesium nanocrystal composites can be controlled by adjusting the amount of the reducing agent in contact with the graphene oxide.

According to an embodiment, a method for preparing a reduced graphene oxide-magnesium nanocrystal composite includes contacting graphene oxide with a first reducing agent to prepare a reduced graphene oxide, and co-reducing the reduced graphene oxide and a precursor of magnesium in the presence of a second reducing agent to prepare a reduced graphene oxide-magnesium nanocrystal composite.

In the method, by adjusting the amount of the first reducing agent in contact with the graphene oxide, reactive sites for magnesium nucleation and growth on graphene oxide can be controlled, resulting in clear difference in the size of the magnesium nanocrystals in the composites.

The magnesium nanocrystals may be encapsulated in a sheet of reduced graphene oxide in the reduced graphene oxide-magnesium nanocrystal composites.

The first reducing agent may be NaBH$_4$, ascorbic acid, hydrazine hydrate, dimethyl hydrazine, hydroiodic acid, or a combination thereof.

The second reducing agent may be lithium naphthalenide, sodium naphthalenide, potassium naphthalenide, or a combination thereof.

A weight ratio of the graphene oxide and the first reducing agent may be about 1:1 to about 1:20.

The precursor of magnesium may be bis(cyclopentadienyl) magnesium, magnesium chloride, di-n-butyl magnesium, or a combination thereof.

In an embodiment, the size of the magnesium nanocrystals may be less than or equal to about 500 nm.

In another embodiment, the size of the magnesium nanocrystals may be greater than or equal to about 1 nm and less than or equal to about 200 nm.

In another embodiment, the size of the magnesium nanocrystals may be greater than or equal to about 1 nm and less than or equal to about 100 nm.

A hydrogen absorption activation energy of the magnesium nanocrystals may be more than or equal to 65 KJ·mol$^{-1}$ and less than or equal to about 120 KJ·mol$^{-1}$.

A hydrogen release reaction induction period of the magnesium nanocrystals may be less than or equal to about 0.5 hours.

In an embodiment, a reduced graphene oxide-magnesium nanocrystal composite prepared through the aforementioned preparation method is provided.

The size of the magnesium nanocrystals in the reduced graphene oxide-magnesium nanocrystal composites may be readily controlled by adjusting the amount of the reducing agent through the method for preparing the reduced graphene oxide-magnesium nanocrystal composites according to an embodiment, and thereby hydrogen storage capacity and kinetics of the reduced graphene oxide-magnesium nanocrystal composites may be easily controlled.

BRIEF DESCRIPTION OF THE DRAWINGS

FIG. 4 shows the hydrogen absorption and desorption kinetics of the composites of Examples 1 to 3.

FIG. 5 shows the hydrogen absorption and desorption activation energy barriers of the composites of Examples 1 to 3.

DETAILED DESCRIPTION OF THE EMBODIMENTS

Figure 1:
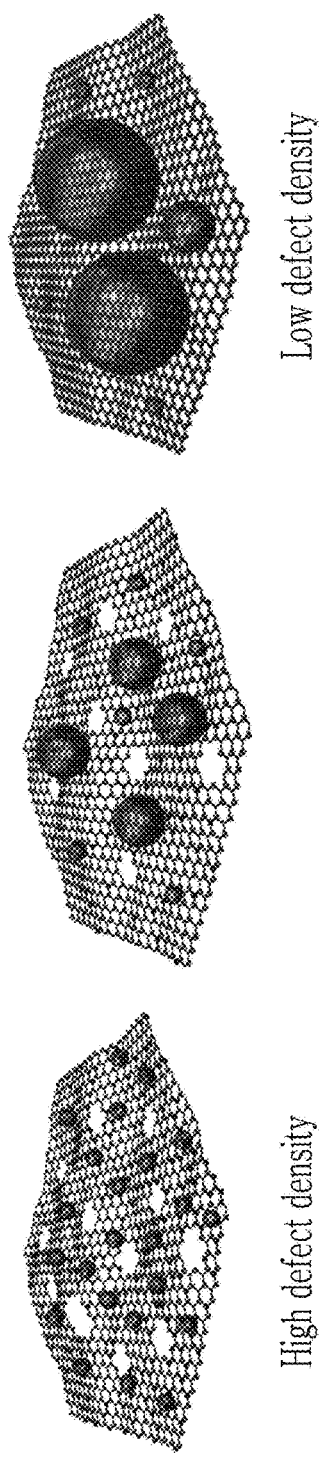
FIG. 1 shows a schematic view of controlling the size of magnesium in a reduced graphene oxide-magnesium nanocrystal composite.

Hereinafter, embodiments of the present invention are described in detail. However, this is presented as an example, and the present invention is not limited thereto, and the present invention is only defined by the appended claims.

According to an embodiment, a method for preparing a reduced graphene oxide-magnesium nanocrystal composite includes contacting graphene oxide with a first reducing agent to prepare a reduced graphene oxide, and co-reducing the reduced graphene oxide and a precursor of magnesium in the presence of a second reducing agent to prepare a reduced graphene oxide-magnesium nanocrystal composite. In the method, by adjusting the amount of the first reducing agent in contact with the graphene oxide, reactive sites for magnesium nucleation and growth on graphene oxide can be controlled, resulting in clear difference in the size of the magnesium nanocrystals in the composites.

Recently, as hydrogen has been spotlighted as a low-carbon fuel, effective hydrogen storage system enabling rapid charging/discharging is imperative. As a candidate, a composite in which magnesium nanocrystals are bonded to graphene oxide is in the spotlight as a hydrogen storage medium.

However, the magnesium hydride has slow hydrogen absorption/desorption kinetics and thermodynamic stability, requiring high temperatures during the hydrogenation/dehydrogenation and long charge/discharging time.

In order to solve these problems, a method of reducing the bulk magnesium into a nanosize to decrease a diffusion path of the hydrogen and improve thermodynamic/kinetic properties of the magnesium during the hydrogenation or dehydrogenation has been developed.

The present inventors have further discovered that defects (vacancies or an oxygen functional groups) of graphene oxide are bonded with the magnesium to hinder coalescence of magnesium nanocrystals themselves and thus limit the magnesium nanocrystals into a nanosize. Moreover, it was founded that the size of magnesium nanocrystals can be controlled by adjusting amount of a reducing agent to remove the defects of graphene oxide.

In addition, when the size of the magnesium nanocrystals is controlled, hydrogen storage properties of the magnesium can be changed, because a diffusion path of hydrogen atoms varies according to the size and shape of the magnesium nanocrystals.

Accordingly, an embodiment provides a method of preparing the reduced graphene oxide-magnesium nanocrystal composites capable of controlling the size of magnesium nanocrystals according to an amount of the reducing agent used during the synthesis in the reduced graphene oxide-magnesium nanocrystal composites prepared through a one-pot synthesis method of graphene oxide and magnesium.

The method for preparing reduced graphene oxide-magnesium nanocrystal composites includes the following processes:

contacting graphene oxide with a first reducing agent to prepare a reduced graphene oxide; and co-reducing the reduced graphene oxide and a precursor of magnesium in the presence of a second reducing agent to prepare a reduced graphene oxide-magnesium nanocrystal composite, wherein by adjusting the amount of the first reducing agent in contact with the graphene oxide, the size of the magnesium nanocrystals in the composite is controlled.

The reduced graphene oxide-magnesium nanocrystal composite is prepared in the one-pot method, which is a simple synthesis method.

First, the first reducing agent is brought into contact with the graphene oxide to reduce the graphene oxide.

The first reducing agent may be $NaBH_4$, ascorbic acid, hydrazine hydrate, dimethyl hydrazine, hydroiodic acid, or a combination thereof. Through the first reducing agent, density of oxygen functional groups of the graphene oxide may be controlled.

The graphene oxide and the first reducing agent may be used in a weight ratio of about 1:1 to about 1:20. In an embodiment, the weight ratio may be about 1:1 to about 1:18, about 1:1 to about 1:16, about 1:1 to about 1:15, about 1:1 to about 1:12, about 1:1 to about 1:10, about 1:1 to about 1:8, about 1:1 to about 1:6, about 1:1 to about 1:5, about 1:1 to about 1:4, about 1:1 to about 1:3, or about 1:1 to about 1:2. In an embodiment, without the process of contacting the first reducing agent with the graphene oxide, the graphene oxide may be used to prepare the graphene oxide-magnesium nanocrystal composite.

The reduced graphene oxide-magnesium nanocrystal composites are prepared by co-reducing the reduced graphene oxide and the magnesium precursor under the second reducing agent.

The second reducing agent may be a reducing agent capable of reducing the reduced graphene oxide and the magnesium precursor, for example, lithium naphthalenide, sodium naphthalenide, potassium naphthalenide, or a combination thereof.

The magnesium precursor may be any magnesium compound reduced into magnesium crystals, for example, bis(cyclopentadienyl) magnesium, magnesium chloride, di-n-butyl magnesium, or a combination thereof, but is not limited thereto.

The magnesium precursor may be stabilized by the defects (vacancies and oxygen functional groups) of the graphene oxide and the reduced graphene oxide. Since the defects may vary according to a degree of reduction of the graphene oxide, the defects are more removed, as the graphene oxide is more reduced.

The defects of the graphene oxide can affect growth of magnesium nanocrystals. For example, as the graphene oxide has more oxygen functional groups, electrostatic interactions with magnesium ions ($Mg^{2+}$) of the magnesium precursor may increase and thus block diffusion and recrystallization of the magnesium. On the other hand, in the reduced graphene oxide having a high degree of reduction, since the oxygen functional groups and defects of graphene are reduced, the electrostatic interactions between the graphene oxide and the magnesium precursor are also reduced, so that magnesium may be diffused through graphite lattices and recrystallized into a coalesced single crystal structure.

FIG. 1 shows a schematic view of controlling the size of magnesium in the reduced graphene oxide-magnesium nanocrystal composites. In the reduced graphene oxide-magnesium nanocrystal composites, the more reduced graphene oxide induces coalesced magnesium nanocrystals on the surface due to lack of reactive sites and consequent increase in size of the magnesium nanocrystals.

In the reduced graphene oxide-magnesium nanocrystal composites, the magnesium nanocrystals can be encapsulated in a sheet of the reduced graphene oxide. Since the encapsulated magnesium nanocrystals are not coalesced with each other, the average size of the magnesium nanocrystals in the composites may be smaller than that of non-encapsulated magnesium nanocrystals.

The magnesium nanocrystals may have an average size of less than or equal to about 500 nm. For example, the magnesium nanocrystals may have an average size of greater than or equal to about 1 nm, greater than or equal to about 5 nm, greater than or equal to about 10 nm, greater than or equal to about 20 nm, greater than or equal to about 30 nm, greater than or equal to about 40 nm, greater than or equal to about 50 nm, greater than or equal to about 60 nm, greater than or equal to about 70 nm, greater than or equal to about 80 nm, greater than or equal to about 90 nm, greater than or equal to about 100 nm, greater than or equal to about 150 nm, greater than or equal to about 200 nm, greater than or equal to about 250 nm, greater than or equal to about 300 nm, greater than or equal to about 350 nm, greater than or equal to about 400 nm, or greater than or equal to about 450 nm, and less than or equal to about 500 nm, less than or equal to about 450 nm, less than or equal to about 400 nm, less than or equal to about 350 nm, less than or equal to about 300 nm, less than or equal to about 250 nm, less than or equal to about 200 nm, less than or equal to about 150 nm, less than or equal to about 100 nm, less than or equal to about 90 nm, less than or equal to about 80 nm, less than or equal to about 70 nm, less than or equal to about 60 nm, less than or equal to about 50 nm, less than or equal to about 40 nm, less than or equal to about 30 nm, less than or equal to about 20 nm, less than or equal to about 10 nm, or less than or equal to about 5 nm.

The magnesium nanocrystals can function as a hydrogen storage medium. The reduced graphene oxide-magnesium nanocrystal composites have hydrogen absorption activation energy barriers of more than or equal to about 65 KJ·mol$^{-1}$ and less than or equal to about 120 KJ·mol$^{-1}$, which is not high, and thus may appropriately perform the hydrogen storage medium function.

The hydrogen storage function is dependent on a shape and a size of the magnesium nanocrystals, wherein as the average size of the magnesium nanocrystals increases (i.e., as the magnesium nanoparticles are more coalesced), a hydrogen diffusion path is lengthened, causing deteriorated hydrogen absorption/desorption properties of the composites.

On the other hand, an induction period for starting the hydrogen desorption reaction tends to increase as the average size of the magnesium nanocrystals increases, because the increased size of the magnesium nanocrystals prolongs a distance traveled by hydrogen atoms required to bond each other. In an embodiment, even though the average size of the nanocrystals is larger, the induction period may still be short. It can be speculated as a result of thermal conductivity of reduced graphene oxide, wherein since the thermal conductivity increases as a degree of reduction of the reduced graphene oxide increases, the induction period for the hydrogen desorption reaction, which is an endothermic reaction, may be reduced.

The hydrogen release reaction induction period of the magnesium nanocrystals may be less than or equal to about 0.5 hours. For example, the induction period may be less than or equal to about 0.5 hours, less than or equal to about 0.45 hours, less than or equal to about 0.4 hours, less than or equal to about 0.35 hours, less than or equal to about 0.3 hours, less than or equal to about 0.25 hours, less than or equal to about 0.2 hours, less than or equal to about 0.15 hours, or less than or equal to about 0.1 hours.

In an embodiment, a reduced graphene oxide-magnesium nanocrystal composite prepared through the method for preparing reduced graphene oxide-magnesium nanocrystal composite is provided. The reduced graphene oxide-magnesium nanocrystal composites may be used as a hydrogen storage medium.

Hereinafter, the present invention will be described in more detail through examples, but the following examples are for illustrative purposes and are not intended to limit the present invention.

EXAMPLES

Example 1

1. Preparation of Reduced Graphene Oxide 20 mg of graphene oxide powder (an ACS material, LLC) was dispersed in deionized water and ultrasonicated for 2 hours. After the ultrasonication, 100 mg of a reducing agent, NaBH$_4$, was slowly added in a dropwise fashion to the graphene oxide solution and then stirred for 3 hours. After the stirring, the resultant was additionally centrifuged at 10000 rpm for 20 minutes, and the reduced graphene oxide was dialyzed through a dialysis tube for 2 days to remove residues such as sodium ions and the like. Subsequently, the suspension was centrifuged to separate a supernatant, and the residue was dried under vacuum, obtaining a reduced graphene oxide.

2. Preparation of Reduced Graphene Oxide-Magnesium Nanocrystal Composite

In an argon glove box, 0.072 g (10.5 mmol) of lithium and 0.96 g (7.5 mmol) of naphthalene were added to 48 mL of THF and then dissolved by stirring for 3 hours. Subsequently, 0.924 g (6 mmol) of Cp$_2$Mg was added to a reduced graphene oxide solution and then stirred for 30 minutes. Then, the mixed solution was added to the lithium naphthalenide solution and stirred for 2 hours. The stirred solution was centrifuged at 10000 rpm for 20 minutes and then repeatedly washed with THF to remove unreacted lithium naphthalenide. Subsequently, the residue was completely dried under vacuum, obtaining a reduced graphene oxide-magnesium nanocrystal composite.

Example 2

A reduced graphene oxide-magnesium nanocrystal composite was obtained according to the same method as Example 1, except that 200 mg of NaBH$_4$ was added in a dropwise fashion.

Example 3

A reduced graphene oxide-magnesium nanocrystal composite was obtained according to the same method as Example 1, except that NaBH$_4$ was not added in a dropwise fashion.

Evaluation Examples

1. Size of Magnesium Nanocrystals According to Degree of Reduction

TEM images of the composites of Examples 1 to 3 were taken at a voltage of 300 kV with a high-resolution transmission electron microscope (Tecnai G2 F30 S-Twin, FEI company).

Figure 2:
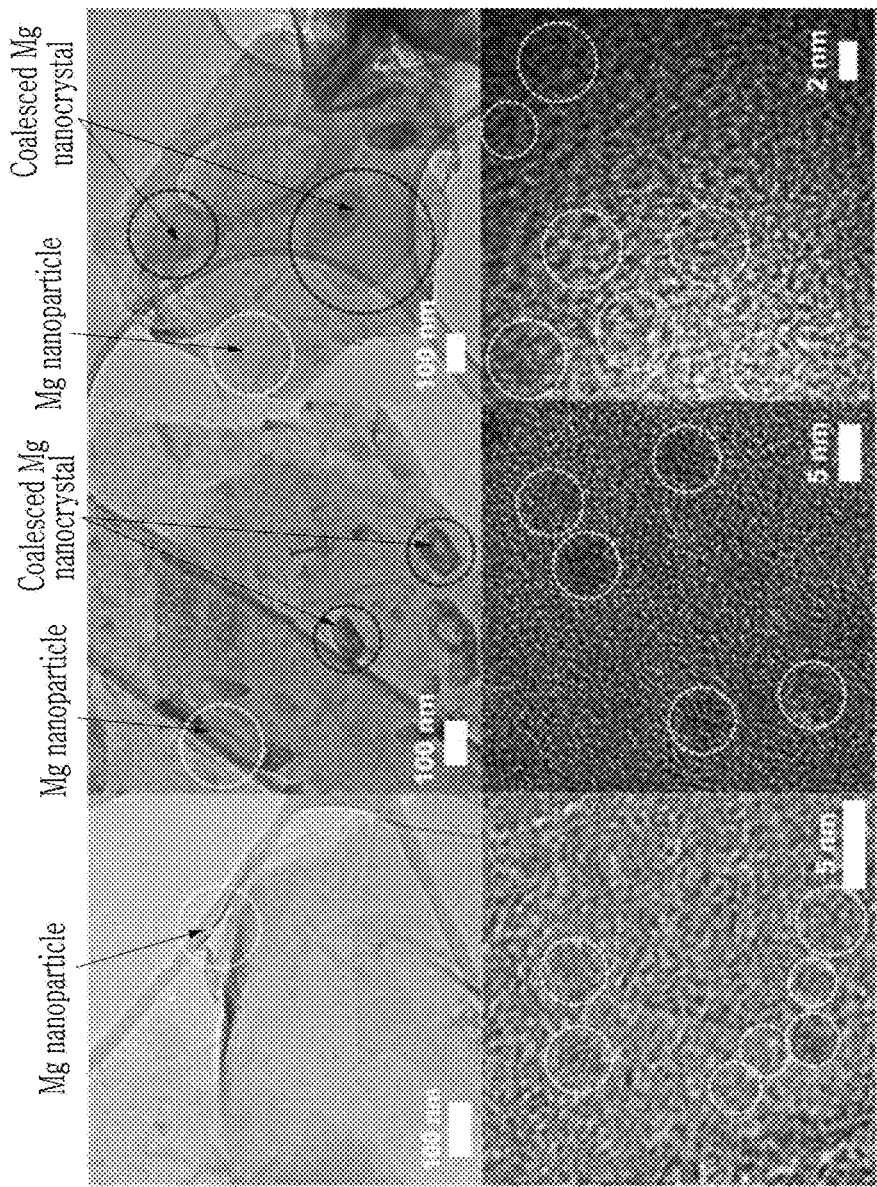
FIGS. 2(a) to 2(c) show TEM images of magnesium nanocrystals of the composites of Examples 1 to 3.

FIGS. 2(a) to 2(c) show the TEM images of the magnesium nanocrystals of the composites according to Examples 1 to 3. In FIG. 2(a), the magnesium nanocrystals of the composite according to Example 3 are shown. Herein, the magnesium nanocrystals had a uniform particle size with a diameter of 3 nm to 4 nm. In FIG. 2(b), the magnesium nanocrystals of Example 1 are shown. Herein, in addition to magnesium nanocrystals having a small diameter, coalesced magnesium nanocrystals sparsely appeared and had a size of about 100 nm to 200 nm. In FIG. 2(c), the magnesium nanocrystals of the composite according to Example 2 are shown. Herein, compared with a case that graphene oxide was in contact with a first reducing agent in a weight ratio of 1:5, the coalesced magnesium nanocrystals significantly increased and had a size of about 400 nm to 500 nm.

Accordingly, referring to FIGS. 2(a) to 2(c), magnesium nanocrystals had a different size depending on a degree of reduction of graphene oxide. The higher degree of reduction of the graphene oxide was, the more frequently the magnesium nanocrystals were coalesced, leading to the larger average size of the magnesium nanocrystals.

2. Measurement of XPS (X-Ray Photoelectron Spectroscopy)

Figure 3:
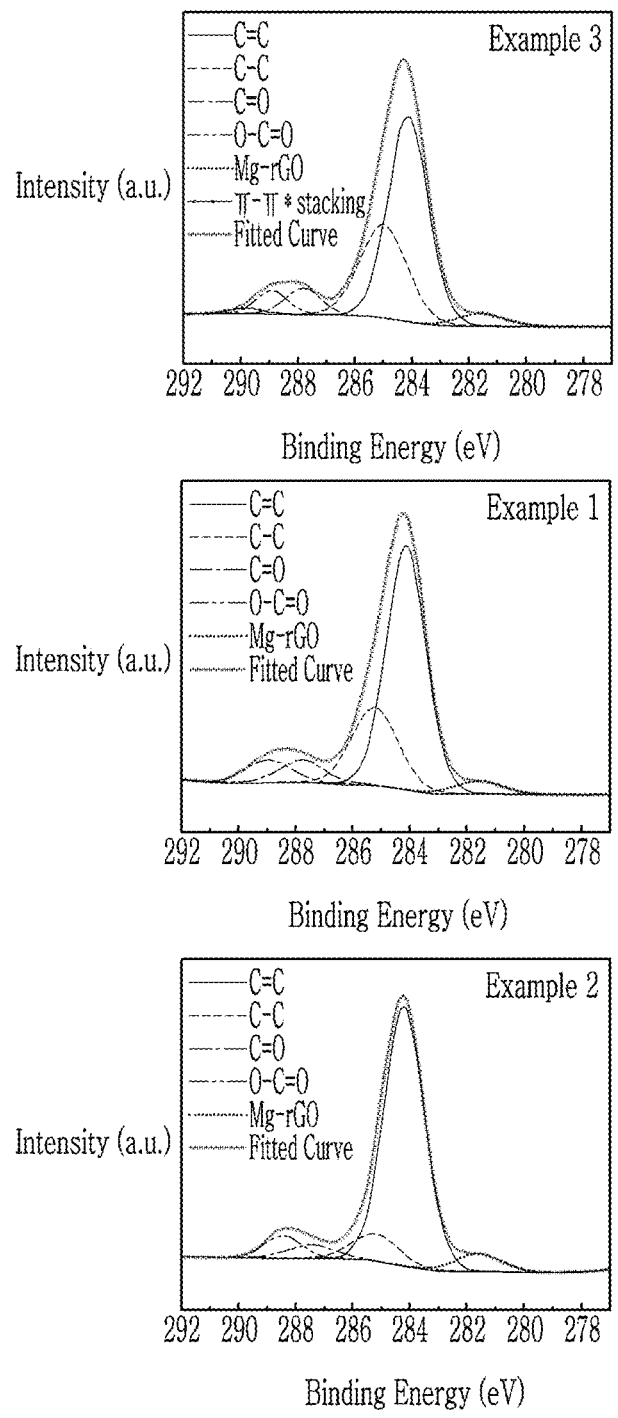
FIG. 3 shows XPS spectra of reduced graphene oxide-magnesium nanocrystal composites of the composites of Examples 1 to 3.

The magnesium nanocrystals of the composites according to Examples 1 to 3 were measured with respect to X-ray photoelectron spectra with Al Kα (Sigma Probe, Thermo VG Scientific), which are shown in FIG. 3.

Referring to FIG. 3, as the degree of reduction of graphene oxide increased, sp2 hybridized carbon increased and the oxygen functional groups were removed. In addition, the number of sites where graphene oxide sheets were bonded with the magnesium nanocrystals decreased, and accordingly, coalesced magnesium particles were more easily formed due to diffusion of magnesium nanocrystals. Furthermore, all the composites according to Examples 1 to 3 had similar intensity at 281.5 eV, which indicates that magnesium was well bonded with the reduced graphene oxide in the composites. Therefore, the growth of the magnesium nanocrystals was greatly affected by defect density of the graphene oxide.

3. Evaluation of Hydrogen Absorption/Desorption Ability

(1) Evaluation of Hydrogen Storage Capacity and Induction Period

The magnesium nanocrystals of the composites according to Examples 1 to 3 were measured with respect to hydrogen absorption capacity at 200° C. under a hydrogen atmosphere of 15 bar and hydrogen desorption capacity at 300° C. under a hydrogen atmosphere of 0 bar, which are shown in FIG. 4. Herein, hydrogen was absorbed as magnesium hydride form through a reaction with magnesium.

All the composites of Examples 1 to 3 absorbed greater than or equal to 4 wt. % of hydrogen for 2 hours based on a total weight of each composite and thus exhibited excellent hydrogen absorption ability. Particularly, the composite of Example 3, which had a high defect density in graphene due to non-contact with the first reducing agent, exhibited excellent absorption ability enough to absorb 6.25 wt. % of hydrogen based on the total weight of the composite. The reason is that hydrogenation and dehydrogenation are partially occurred due to the larger size of magnesium nanocrystals for the higher degree of reduction of graphene oxide-magnesium composite.

On the other hand, an induction period for starting the hydrogen desorption reaction was less than or equal to 0.5 hours in all of Examples 1 to 3. However, the composite of Example 1 exhibited a longer induction period than the composite of Example 2, because the graphene oxide having a high degree of reduction of Example 2 exhibited higher thermal conductivity than the reduced graphene oxide of Example 1.

(2) Measurement of Hydrogen Absorption and Desorption Activation Energy

The composites of Examples 1 to 3 were measured with respect to activation energy required for hydrogen absorption and desorption, and the results are shown in FIG. 5.

In all the composites of Examples 1 to 3, since activation energy required for hydrogen absorption was 85 KJ·mol$^{-1}$ or less at initial absorption stage, a large amount of energy was not required for the hydrogen absorption. In particular, the composite of Example 3 having high defect density in graphene due to non-contact with the first reducing agent exhibited high hydrogen absorption activation energy of 65 to 75 KJ·mol$^{-1}$, which was lower than the activation energy of Examples 1 and 2, and herein, the higher the activation energy was, the higher the reduction degree of graphene oxide was.

Figure 6:
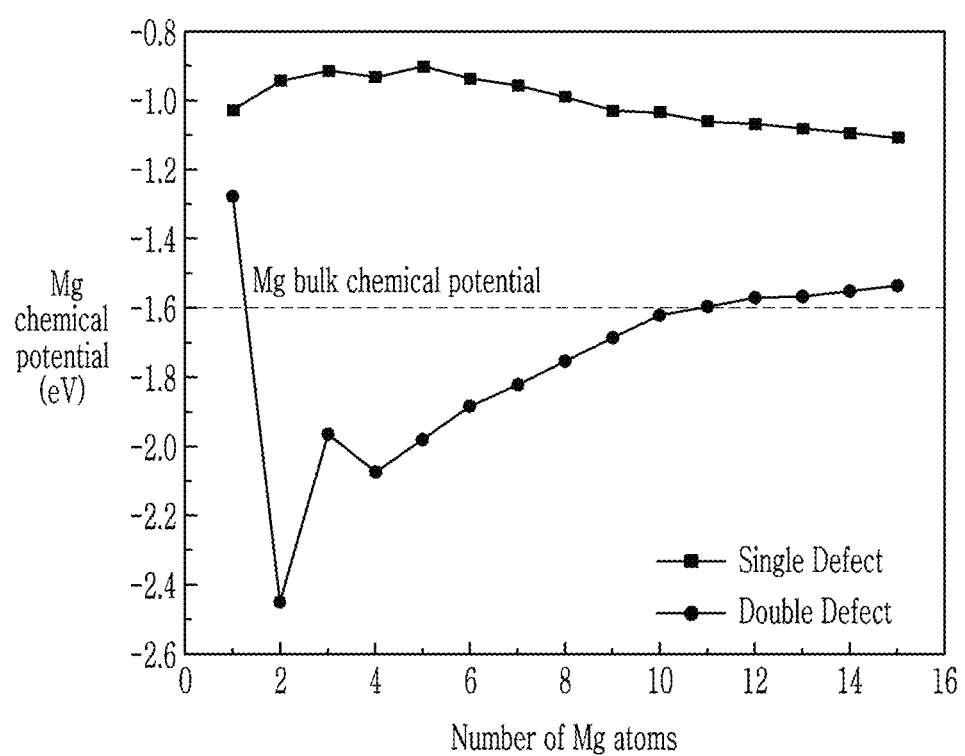
FIG. 6 shows the chemical potential of magnesium according to the defect density of reduced graphene oxide.

4. Measurement of Chemical Potential According to Defect Density of Reduced Graphene Oxide A defect density of graphene was used to calculate a chemical potential of magnesium, when magnesium atoms were added to graphene under two conditions of ① vacancy+hydrogen functional group (single defect) per 50 carbon atoms and ② vacancy+hydrogen functional group (double defects) per 50 carbon atoms, and the results are shown in FIG. 6.

When there was one defect (vacancy), the chemical potential of magnesium was higher than that of bulk magnesium, and as the magnesium atoms were more adsorbed in the reduced graphene oxide, the chemical potential slowly decreased. However, when there were two defects, and two or more of the magnesium atoms started to be adsorbed, the chemical potential was lower than that of the bulk magnesium, which shows that magnesium was adsorbed in the defects of graphene, and accordingly, as the defects increased, magnesium was more adsorbed in the defects. On the other hand, when the defect density of the graphene was reduced, magnesium might be coalesced with each other and form magnesium crystals.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A method for preparing a reduced graphene oxide-magnesium nanocrystal composite, comprising:
    contacting graphene oxide with a first reducing agent to prepare a reduced graphene oxide; and
    co-reducing the reduced graphene oxide and a precursor of magnesium in the presence of a second reducing agent to prepare a reduced graphene oxide-magnesium nanocrystal composite,
    wherein by adjusting the amount of the first reducing agent in contact with the graphene oxide, the size of the magnesium nanocrystals in the composite is controlled.

2. The method of claim 1, wherein the magnesium nanocrystals are encapsulated in a sheet of reduced graphene oxide in the reduced graphene oxide-magnesium nanocrystal composites.

3. The method of claim 1, wherein the first reducing agent is NaBH$_4$, ascorbic acid, hydrazine hydrate, dimethyl hydrazine, hydroiodic acid, or a combination thereof.

4. The method of claim 1, wherein the second reducing agent is lithium naphthalenide, sodium naphthalenide, potassium naphthalenide, or a combination thereof.

5. The method of claim 1, wherein a weight ratio of the graphene oxide and the first reducing agent is about 1:1 to about 1:20.

6. The method of claim 1, wherein the precursor of magnesium is bis(cyclopentadienyl) magnesium, magnesium chloride, di-n-butyl magnesium, or a combination thereof.

7. The method of claim 1, wherein a size of the magnesium nanocrystals is less than or equal to about 500 nm.

8. The method of claim 1, wherein a size of the magnesium nanocrystals is greater than or equal to about 1 nm and less than or equal to about 200 nm.

9. The method of claim 1, wherein a size of the magnesium nanocrystals is greater than or equal to about 1 nm and less than or equal to about 100 nm.

10. The method of claim 1, wherein hydrogen absorption activation energy of the magnesium nanocrystals is more than or equal to 65 KJ·mol$^{-1}$ and less than or equal to about 120 KJ·mol$^{-1}$.

11. The method of claim 1, wherein a hydrogen desorption induction period of the magnesium nanocrystals is less than or equal to about 0.5 hours.

12. A reduced graphene oxide-magnesium nanocrystal composite prepared through the method of claim 1.

* * * * *